US011258696B1

(12) United States Patent
Morrison et al.

(10) Patent No.: US 11,258,696 B1
(45) Date of Patent: Feb. 22, 2022

(54) LOW-LATENCY SIGNALING-LINK RETIMER

(71) Applicant: Astera Labs, Inc., Santa Clara, CA (US)

(72) Inventors: Casey Morrison, San Jose, CA (US); Enrique Musoll, San Jose, CA (US); Jitendra Mohan, Santa Clara, CA (US); Pulkit Khandelwal, Cupertino, CA (US); Subbarao Arumilli, Cupertino, CA (US); Vikas Khandelwal, San Jose, CA (US); Ken (Keqin) Han, Fremont, CA (US); Charan Enugala, Newark, CA (US); Vivek Trivedi, Fremont, CA (US); Chi Feng, San Jose, CA (US)

(73) Assignee: Asiera Labs, Inc., Santa Clara, CA (US)

( * ) Notice: Subject to any disclaimer, the term of this patent is extended or adjusted under 35 U.S.C. 154(b) by 0 days.

(21) Appl. No.: 16/893,195

(22) Filed: Jun. 4, 2020

Related U.S. Application Data

(60) Provisional application No. 62/857,274, filed on Jun. 4, 2019.

(51) Int. Cl.
*H04L 12/727* (2013.01)
*H04L 45/121* (2022.01)
*H04L 49/9057* (2022.01)
*H04L 69/28* (2022.01)

(52) U.S. Cl.
CPC ........ *H04L 45/121* (2013.01); *H04L 49/9057* (2013.01); *H04L 69/28* (2013.01)

(58) Field of Classification Search
CPC ............ G06F 11/0757; G06F 11/0778; G06F 13/4045; G06F 13/4068; G06F 13/4291; H04L 45/121; H04L 49/9057; H04L 69/28
USPC ........................................ 370/231, 235, 360
See application file for complete search history.

(56) References Cited

U.S. PATENT DOCUMENTS

| 10,146,722 | B1 | 12/2018 | Brown et al. | |
| 2010/0329285 | A1 | 12/2010 | Stanton et al. | |
| 2012/0082463 | A1 | 4/2012 | Kasprzyk | |
| 2017/0351640 | A1 | 12/2017 | Nilange et al. | |
| 2017/0371831 | A1* | 12/2017 | Das Sharma | ....... G06F 13/4068 |
| 2019/0258600 | A1* | 8/2019 | Das Sharma | ....... G06F 11/0778 |

OTHER PUBLICATIONS

Intel Corporation (Samaan et al.), "High-Speed Serial Bus Repeater Primer—Re-driverand Re-timer Micro-architecture, Properties and Usage," Revision 1.2, Oct. 2015, 72 pages.
Intel Corporation, "PCI Express (PCIe) 4.0 Retimer Supplemental Features and Standard BGA Footprint, Revision 004," Jun. 2018, 53 pages.
PCI-SIG, "PCI Express Base Specification Revision 5.0 Version 1.0", May 22, 2019, 1299 pages.

* cited by examiner

*Primary Examiner* — Harun Chowdhury
(74) *Attorney, Agent, or Firm* — Charles Shemwell

(57) ABSTRACT

A signaling-link retimer concatenates discontiguous leading and trailing portions of a precoded and scrambled symbol stream, shunting the trailing portion of the stream ahead of unneeded stream content to dynamically reduce the number of symbols queued between retimer input and output and thus reduce retimer transit latency.

18 Claims, 2 Drawing Sheets

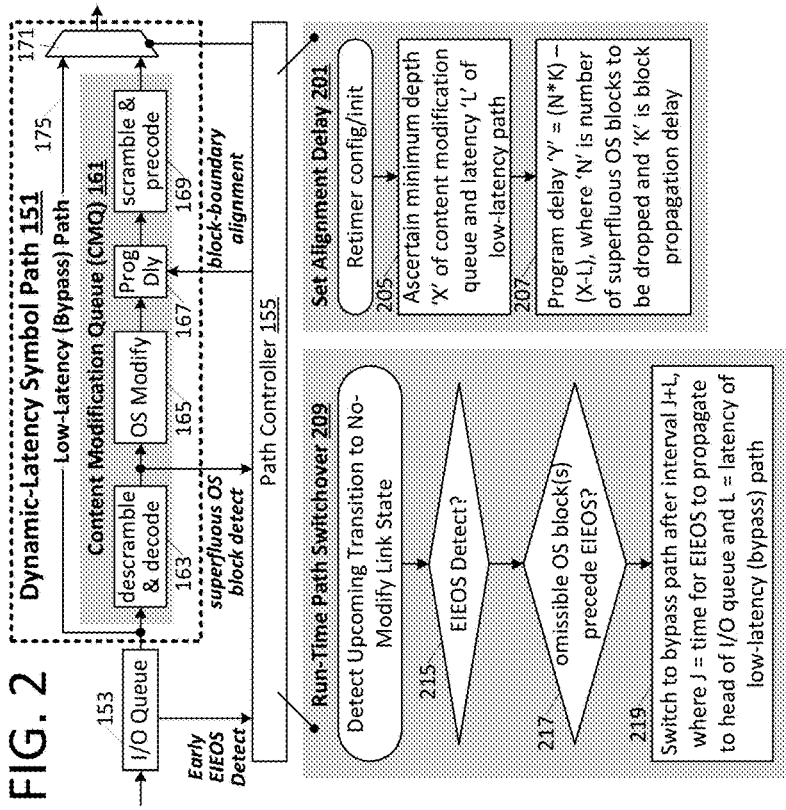
FIG. 1
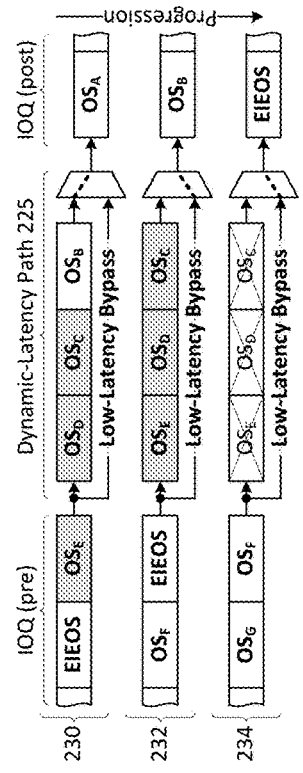
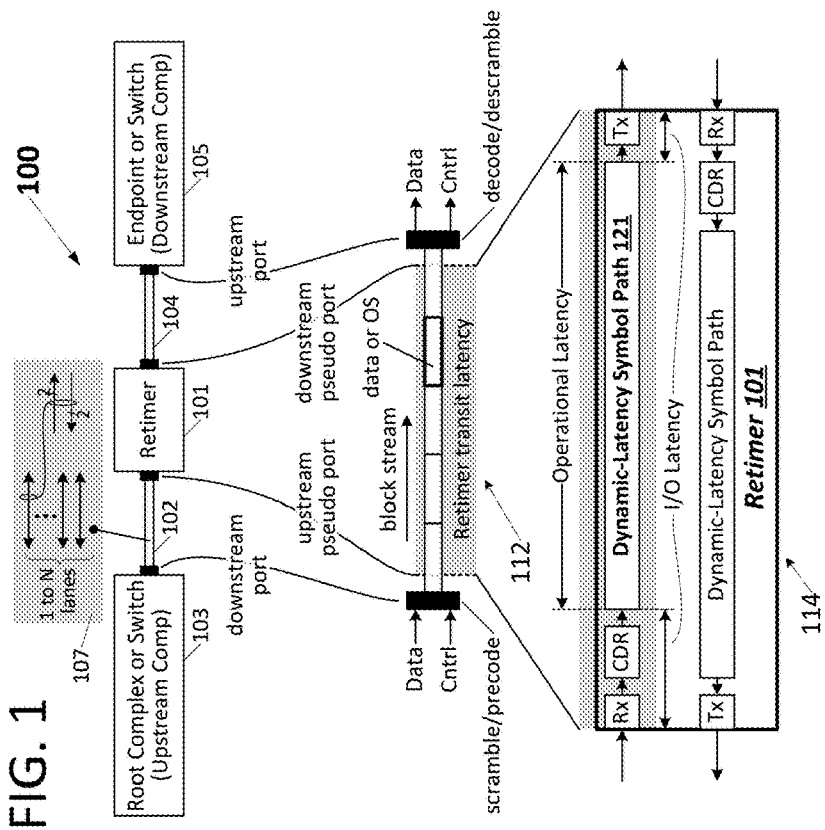
FIG. 2
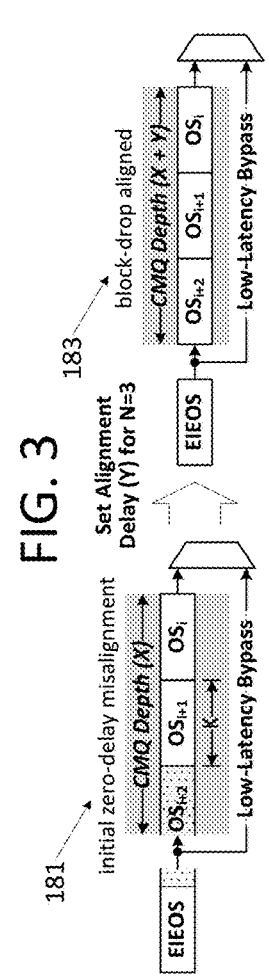
FIG. 3
FIG. 4

LOW-LATENCY SIGNALING-LINK RETIMER

CROSS REFERENCE TO RELATED APPLICATIONS

This application hereby incorporates by reference and claims the benefit of U.S. provisional application No. 62/857,274 filed Jun. 4, 2019.

DRAWINGS

The various embodiments disclosed herein are illustrated by way of example, and not by way of limitation, in the figures of the accompanying drawings and in which like reference numerals refer to similar elements and in which:

FIG. 1 illustrates an embodiment of a synchronous signaling system having a low-latency link retimer coupled between upstream and downstream components via respective signaling links;

FIG. 2 illustrates an embodiment of a dynamic-latency symbol path together with a front-end signaling I/O (input/output) queue and path control logic circuitry;

FIG. 3 illustrates an exemplary logical-block alignment programmably effected between the content-modification and low-latency symbol propagation paths of FIG. 2;

FIG. 4 illustrates an exemplary stream progression within the dynamic-latency symbol path of FIG. 2;

Figure 6:
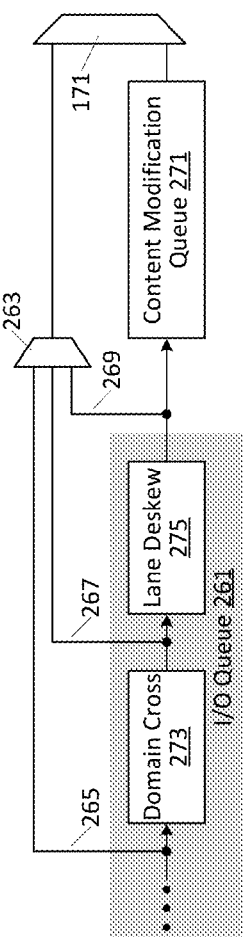
Figure 5:
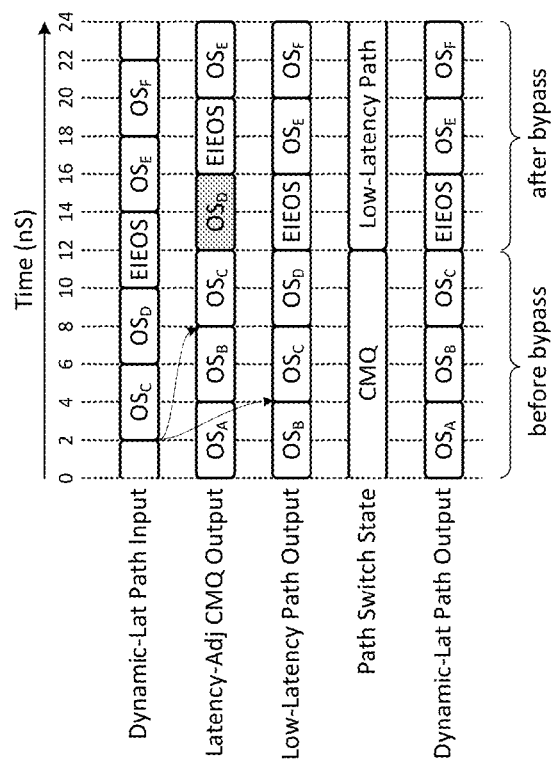

FIG. 5 illustrates exemplary path switchover timing in an embodiment of the dynamic-latency symbol path of FIG. 2 having a nonzero bypass path latency; and FIG. 6 illustrates an exemplary fragment of an I/O queue together with bypass-path-select circuitry that enables programmable selection between multiple bypass paths, each bypassing a respective portion of the symbol propagation queue within a retimer.

DETAILED DESCRIPTION

In various embodiments presented herein, a signaling-link retimer concatenates discontiguous leading and trailing portions of a precoded and scrambled symbol stream, advancing/shunting the trailing portion of the stream ahead of unneeded stream content to dynamically reduce the number of symbols queued between retimer input and output and thus reduce retimer transit latency. In a number of embodiments, the retimer symbol queue (i.e., sequence of staging elements interconnected to form a shift register between retimer input and output) includes a content modification queue ("modify queue") to enable identification and modification of selected logical blocks (groups of symbols) within the symbol stream and also a low-latency path ("bypass path") coupled in parallel with the modification queue to enable the stream shunting operation; bypassing the modify queue (and excising/dropping its content from the symbol stream) at a strategic point in the symbol stream to effect a low-latency run-time symbol propagation path. To avoid loss of block encoding coherency at modify-queue bypass, path control circuitry within the retimer aligns the modify queue depth (adding stages and thus latency to that queue as necessary) such that the latency of the modify queue exceeds the latency of the bypass path by an integer number of logical block intervals and executes the bypass precisely on a logical block boundary such that switchover to the low-latency path (bypassing the modify queue) excises discrete/intact logical blocks from the stream and thus appends the logical block at the head of the trailing portion of the stream (at the input of the modification queue in the case of a zero-latency bypass path) to the logical block at the tail of the leading portion of the stream (immediately past the output of the modify queue). Moreover, to avoid loss of coherency between scrambling and descrambling circuits (upstream and downstream from the retimer, respectively), the path control circuitry executes the modify-queue bypass when a protocol-specific scrambler-resynchronization block ("resync block") arrives, and it times the bypass activation such that the resync block is the first block transmitted from the low-latency path to trigger descrambler resynchronization within the downstream receiver prior to downstream descrambling of the trailing portion of the symbol stream. These and other embodiments and features are presented in further detail below.

FIG. 1 illustrates an embodiment of a synchronous signaling system 100 having a low-latency link retimer 101 coupled between upstream and downstream components 103, 105, via respective signaling links 102 and 104. Retimer 101 extends the viable signaling path length between the upstream and downstream components by applying timing information and digital data recovered from an inbound symbol stream (sourced by either component 103, 105 and destined for the other) to produce an enhanced-integrity outbound symbol stream (with occasional content modification)—overall, permitting the upstream and downstream components to communicate reliably (e.g., meeting specified bit error rate) over otherwise impracticable distances.

For purposes of example and clarity of explanation, signaling links 102, 104 and driver/receiver ports within retimer 101, upstream component 103, and downstream component 105 (i.e., downstream port of component 103, upstream port of component 105 and upstream/downstream pseudo ports of retimer 101, as shown) are assumed to implement a Peripheral Component Interconnect Express (PCIe) communication specification and thus described in the terminology of that specification. Accordingly, upstream component 103 may be a root complex or switch and the downstream component 105 may be an endpoint or switch, and the signaling link coupled between a given pair of components (i.e., upstream component and retimer or downstream component and retimer) may be implemented by 1 to N lanes (e.g., 1, 2, 4, 8, 12, 16, 32, etc.) with each lane including a dedicated differential signaling pair for each signaling direction—an arrangement generally shown at 107.

Symbols conveyed in respective unit intervals on a given lane (i.e., duration of a valid symbol at a given point on a differential conductor pair) are assumed to be bits so that each unit interval (UI) is a bit time ($t_{bit}$). Further, information is scrambled and (in some cases) precoded prior to transmission (i.e., encoded for spectral diversity and/or other signal integrity purposes) into 130-bit logical blocks that correspond to 128 bits of raw content (i.e., 128b/130b encoding scheme) and two bits of block encoding. Each logical block ("block" for short) conveys either physical-layer control information—so-called "ordered-set" blocks—or payload information (including control information for higher PCIe protocol layers) in "data" blocks. Unless otherwise stated or clear from context, references herein to data streams (or block streams or bit streams or symbol streams) should be understood to mean serial streams of order-set blocks ("ordered-sets") and/or data blocks, and references to "data" should be likewise be understood to mean control information (i.e., contents of ordered-set blocks) and/or payload information. For ease of understanding, link (or interconnect) operation is occasionally described below in the context of a single lane—in all cases the link may include multiple lanes each conveying respective serial block streams in. In the high-speed, embedded-clock, scrambled and precoded signaling contemplated herein (e.g., 16 giga-transfers per second (16 GT/s) with, for example, one single-bit symbol transfer per cycle of a 16 GHz transmit clock or one two-bit symbol transfer (e.g., 4-PAM) per cycle of an 8 GHz transmit clock) each of the system components (101, 103, 105) generally includes receive/transmit equalization circuitry, lane-to-lane skew compensation circuitry, clock/data recovery (CDR) circuitry, clock-domain crossing circuitry, data scrambling and descrambling circuitry and data precoding/decoding circuitry. In all embodiments, these various circuit elements may be supplemented by others and/or omitted (e.g., lane deskew circuitry omitted or disabled in a single-lane signaling system), faster or slower transfer rates may apply, other logical data organization and/or physical signaling line configuration may apply, 4-level pulse amplitude modulation (4-PAM) symbols (two-bits per symbol) or other multiple-bit symbols may be conveyed on each or any lane per UI, and more generally, physical signaling and signaling protocols according to specifications other than PCIe may be implemented. Also, while block precoding is shown and described with respect to the FIG. 1 embodiment and those discussed below, precoding (and corresponding decoding) may be disabled or omitted altogether in all cases. Though a single link retimer is shown between components 103 and 105, one or more additional retimers (and/or re-drivers or other reach-extension devices) may be deployed to further extend the practicable signaling distance between components 103 and 105. In such cases, the component downstream and/or upstream from low-latency link retimer 101 may be another low-latency link retimer.

Continuing with FIG. 1, a scrambled and (in some cases) precoded stream of blocks transmitted by component 103 and destined for component 105 propagates through the retimer as shown at 112, incurring a transit latency between retimer input and output (at edges of the upstream and downstream ports of the retimer) according to the queue-depth of the retimer—the number of stream-constituent symbols registered within the retimer at any point in time. Blocks streaming in the reverse direction (from downstream component 105 to upstream component 103) similarly propagate through the retimer and thus likewise incur a retimer transit latency, though due to the independent resources provided to implement and manage full duplex signaling (including dynamic latency reduction as detailed below), the counterpart transit latencies for the two streaming directions need not match at a given instant.

Referring to FIG. 1 detail view 114, retimer transit latency may be split conceptually into separate input/output and operational latency components. I/O latency generally results from queuing the incoming symbol stream as necessary to effect content-independent signaling-control operations including, for example and without limitation, receive (Rx) and transmit (Tx) equalization, clock/data recovery (CDR), clock domain crossing (i.e., to the extent that clock generated/recovered via CDR is mesochronous or plesiochronous with respect to the clock driving the circuitry downstream of the CDR), lane deskew, serial-to-parallel/parallel-to-serial conversion, etc. By contrast, operational latency generally results from operations that require in situ identification and occasional modification of symbol stream content—for example, identifying and modifying particular ordered set blocks ("ordered sets") during link recovery and/or initialization. To support this in-band ordered-set modification, the scrambled and precoded symbol stream is descrambled and decoded to expose raw stream content, queued (after scrambling and decoding) to a depth sufficient to provide all information necessary to identify ordered sets to be modified and to implement the modification (and/or carry out operations dependent upon exposed stream content), and then re-scrambled and re-precoded for outbound transmission—operations that require staging (queueing) of relatively lengthy sequences of stream symbols and thus impose substantial additive latency. In some implementations, for example, stream content modification operations require symbol queue depths/lengths sufficient to store a substantial fraction of a 130-bit ordered set or even multiple ordered-set blocks, imposing an operational latency that predominates the retimer transit latency.

In the FIG. 1 retimer, operational latency is dynamically reduced by exploiting different operational requirements imposed in different link states and more specifically that, upon transitioning to a mission-mode link state (e.g., PCIe L0 state—normal traffic flow), (i) ordered-set modification is not required and (ii) just prior to transitioning to a mission-mode link state, one or more ordered sets that have propagated in whole or part into the queue structure provided for content modification may be dropped without protocol disruption. Accordingly, a dynamic-latency symbol path 121 is deployed between inbound and output I/O queues of the retimer (i.e., denoted by "I/O Latency") and switched, according to link state, between a relatively high-latency path through a content modification queue and a low-latency or zero-latency bypass path. Switchover to the low-latency path effectively advances that portion of the symbol stream yet to enter the content modification queue ahead of symbols that have already propagated into the modification queue, effectively excising (dropping, cutting, etc.) the latter from the symbol stream and appending the former with the portion of the symbol stream beyond the content modification queue (i.e., concatenating previously discontiguous (or discontinuous) portions of the symbol stream). In embodiments in which the content modification queue imposes all or a substantial part of the operational latency, retimer transit latency is dramatically reduced upon switchover to the low-latency path, in some cases to half, one-quarter or less of the pre-bypass transit latency.

FIG. 2 illustrates an embodiment of a dynamic-latency symbol path 151 (which may be used to implement symbol path 121 of FIG. 1) together with a front-end signaling I/O queue (e.g., to support signaling control operations and thus part of the I/O latency discussed above) and path control logic circuitry 155 ("path controller"). As shown, dynamic-latency path 151 includes the aforementioned content modification queue 161 (having serially coupled descrambler/decoder 163, ordered-set modify logic 165, programmable delay element 167 and scrambler/precoder 169) together with a path switch circuit 171 (e.g., multiplexer) and a bypass path 175 coupled in parallel with the content modification queue 161 between path switch 171 and the output of I/O queue 153. Though not specifically shown, content modification queue 161 ("modify queue") may include one or more additional functional circuits disposed in the symbol stream propagation path (i.e., the serial symbol flow through descrambler/decoder 163, ordered-set modifier 165, delay element 167 and scrambler/decoder 169) and may include one or more other switch-selectable stream propagation paths routed through alternative or different subsets of functional logic circuits between descrambler/decoder 163 and scrambler/precoder 169.

Path controller 155 monitors stream content within I/O queue 153 and modify queue 161 and, together with link state information (which the path controller may maintain in whole or part based on stream content), executes a run-time switchover 171 to low-latency path at a strategic point in the symbol stream. A number of considerations bear on the switchover instant including, for example and without limitation, avoidance of downstream decoding failure due to mid-block switching (dropping a portion of a logical block needed to decode the whole) and/or avoidance of downstream descrambling failure due to out-of-order symbol reception (i.e., in view of symbols dropped from the stream by the path switchover). Where the symbol stream is both precoded and scrambled, the path control logic avoids block-fracture (switchover at any point between the start and end of a control block or data block) by adding latency within modify queue 161 as necessary to ensure that an integer number of blocks (i.e., no fractions of a block) are excised/dropped from the symbol stream upon switchover to the low-latency path. In an embodiment having a zero-latency bypass path, for example, the path control logic ascertains (e.g., based on markers/fiducials within the symbol stream) the native/unadjusted latency of modify queue 161 (i.e., queue depth 'X') and then configures programmable delay circuit 167 to implement an additive delay/latency 'Y' that aligns the modify queue latency with the propagation time of an integer number of blocks. FIG. 3 illustrates this zero-bypass-latency block-drop alignment—path controller adding (via delay element 167) three clock cycles or unit-intervals of latency to avoid the block-misaligned arrangement at 181 and effect the block-aligned modify queue depth at 183. After setting the alignment delay, path controller 155 ensures that any path switchover occurs at a block boundary (i.e., the block-drop alignment shown in FIG. 3 at 183) so that an integer number of blocks are dropped/excised from the symbol stream and only whole blocks propagate to the output.

Flow diagram 201 in FIG. 2 illustrates the above latency programming operation in the more general circumstance where the latency ('L') of low-latency (bypass) path 175 is or may be nonzero. In that case, path controller 155 increases the latency of the content modification queue (via delay element 167) such that the difference between the modification path latency 'X' and the bypass path latency 'L' corresponds to an integer multiple of the block propagation time (and more specifically the number of blocks to be dropped). More specifically, path controller 155 ascertains the native latency 'X' of the modify queue as well as the latency 'L' of the bypass (low-latency) path at 205 (such ascertainment effected, for example, via direct or inferred latency measurement, receiving information that enables deterministic calculation of the latency values and/or acquiring explicit latency values or indications thereof from a local or remote source—e.g., from a programmed configuration register) and then programs delay element 167 to impose a latency equal to the propagation time of the integer number 'N' of blocks to be dropped less the difference between the latencies of the modification queue and low-latency path (i.e., N*K−(X−L), where 'K' is the block propagation time). Note that despite depiction in a single instance just prior to scramble/precode circuit 169, programmable delay circuit(s) 167 may be implemented at any one or more of various points within the content modification path.

Referring still to the embodiments of FIGS. 2 and 3, loss of downstream descrambler coherency is avoided by executing the path switch upon arrival of a scrambler-resync block at the head of the bypass path (i.e., at the bypass-path input to path switch 171)—that is, arrival of a control block that triggers a re-seeding (or other reset or initialization) of a scrambler or descrambler circuit and thus resynchronizes any scrambler/descrambler pair (e.g., re-seeding counterpart linear feedback shift registers, LFSR). In the PCIe example shown, path controller 155 leverages non-precoded and non-scrambled (i.e., in the clear) transmission of a resync block referred to as an electrical idle exit ordered-set (EIEOS), identifying such control block prior to its arrival at the bypass-path input to path switch 171 and thus prior to its propagation through or even into the content modification queue. In the FIG. 2 embodiment, for example, the path controller may detect the EIEOS within I/O queue 153 and thus before it propagates into either the low-latency bypass path 175 or modify queue 161 (i.e., "early EIEOS detect" as shown). In an alternative embodiment where the bypass path has a nonzero latency, path controller 155 may detect the EIEOS after it has propagated in whole or part into the modify queue and bypass path (i.e., through inspection of contents of either of those paths). In either case, by executing the path switchover at the EIEOS boundary—the configuration shown in a zero-bypass-latency example at 183 in FIG. 3—the portion of the symbol stream advanced out of order (i.e., via bypass path 175) is lead/headed by an EIEOS, thus avoiding descramble failure at the stream destination by triggering descrambler re-seed/reset prior to descrambling stream content that follows the EIEOS.

In a number of implementations, path controller 155 ensures, through selection of the path switchover point, that stream content excised in the switchover to the low latency path is unneeded (omissible, superfluous etc.) by the link protocol and thus may be dropped without disrupting the link protocol and/or compromising link performance. Referring to FIG. 2 flow diagram 209, for example, path controller 155 executes the EIEOS boundary switchover just prior to transitioning into a PCIe L0 state or, more generally, any link state in which content modification is not required ("No-Modify Link State") and which has a preceding link state (e.g., PCIe Recovery link state) in which one or more omissible blocks may precede an EIEOS. Thus, just prior to transitioning to a no-modify link state (i.e., content modification not required), and upon detecting that an EIEOS is poised to arrive at the head of the bypass queue (e.g., EIEOS detected at a given point in I/O queue 153 or modify queue 161—including a point spanning the interconnection of those two queues) and preceded by one or more omissible control blocks 217 (i.e., a number of blocks that meets or exceeds the integer number of blocks that will be excised from the stream upon path switchover), path controller transitions the path-select signal (supplied to path switch 171) when the EIEOS arrives at the head of the bypass path to implement the low-latency retimer transit without loss of precoding or scrambling coherency. In an embodiment in which the path controller detects the EIEOS within I/O queue, the path controller executes the path switch as shown at 219—after delaying for an interval corresponding to the time (J) for the EIEOS to propagate to the head of the I/O queue plus the time (L) required for the EIEOS to propagate from the input (tail) of the bypass path to the head of the bypass path (i.e., the bypass path latency) and thus to the input of path switch 171.

FIG. 4 illustrates an exemplary stream progression within the dynamic-latency symbol path of FIG. 2, showing logical-block content within the dynamic-latency symbol path at 225 (over a sequence of block progression intervals) and within respective segments of the I/O queue that precede and follow (IOQ pre and IOQ post) the dynamic-latency path.

The dynamic-latency path is initially configured for symbol flow through the content modification queue (rather than a zero-latency bypass) as shown at 230 when (i) an EIEOS is detected within the leading signaling-control queue and (ii) the path control logic ascertains, based on symbol stream content and/or link state, that the three ordered-set blocks—a number according to the content modification queue depth in this example—that immediately precede the EIEOS may be dropped without protocol disruption. Upon EIEOS arrival at the head of the preceding I/O queue as shown at 232 (i.e., content modification queue filled with protocol-superfluous ordered-set blocks and, due to zero-latency bypass path, EIEOS is at bypass-path input to path switch), the path controller switches the path-switch configuration to select the low-latency path, thus shunting the EIEOS ahead of omissible blocks $OS_C$, $OS_D$, $OS_E$ (appending EIEOS to the tail of block $OS_B$) and thereby excising blocks $OS_C$, $OS_D$, $OS_E$ from the symbol stream. Upon switchover to the low-latency path, retimer transit latency is reduced by the content modification queue latency (three logical block intervals in this example), reducing overall system latency and enabling use of less complex and/or power-consumptive circuitry (e.g., shallower re-try buffers and simplified associated logic) within upstream and downstream components.

FIG. 5 illustrates exemplary path switchover timing in the more general case where the bypass path latency is non-zero—in this case, an embodiment having a 4 nS block time (e.g., a link conveying 32 GT/s per lane and thus a 130-bit block in ~4 nS per lane), 5 nS native modify-queue latency and 2 nS bypass-path latency. Because the difference between the modify queue and bypass path latencies (X−L=5 nS−2 nS=3 nS) is less than the 4 nS propagation time of a single block, dropping a single block will yield the maximum latency improvement at path switchover. Accordingly, the path controller programs the delay element (e.g., element 167 of FIG. 2) to impose an incremental latency of Y=(N*K)−(X−L)=(1*4 nS)−(5 nS−2 nS)=1 nS. By this operation, the latency-adjusted modification queue output (i.e., to the input of the path-switch circuit) is 6 nS and thus exactly one block propagation interval (4 nS) greater than the 2 nS bypass path latency.

Upon detecting the EIEOS within the symbol stream, the path controller commences count down to the path switch over point, waiting for the EIEOS to propagate to the input of the dynamic-latency path (i.e., head of the I/O queue) and then delaying an additional 2 nS interval (L, the latency of the bypass path) for the EIEOS to reach the head of the bypass path before transitioning the path switch to route the symbol stream via the low-latency path—forwarding the EIEOS via the dynamic-latency path output instead of $OS_D$. The path switch effectively excises (drops) the OSS block from the symbol stream and thus reduces latency through the dynamic-latency path by the 4 nS propagation time of that block—in this example by a factor of 3:1 from 6 nS to 2 nS. Comparing to a conventional approach that lacks the added block-alignment latency (1 nS in this example), latency is still cut by 60%, from 5 nS to 2 nS. When two or more superfluous blocks are dropped/bypassed (i.e., native modification queue depths exceed a single block propagation time), latency reduction becomes even more pronounced.

FIG. 6 illustrates an exemplary fragment of an I/O queue 261 together with bypass-path-select circuitry (multiplexer 263) that enables programmable selection between multiple bypass paths (265, 267, 269), each bypassing a respective portion of the symbol propagation queue within a retimer. In the specific example shown, I/O queue 261 includes, as part of the symbol propagation path, domain crossing circuitry 273 (e.g., a drift buffer or elastic first-in/first-out (FIFO) buffer) and lane deskew circuitry 275. The domain crossing circuitry enables symbol transfer between mesochronous or plesiochronous timing domains (e.g., clock domains corresponding respectively to a clock embedded in the incoming symbol stream which is extracted by the CDR circuit and a clock provided to the retimer logic downstream of the CDR circuit) and generally requires symbol buffering/queuing of data to a depth of several clock cycles. Lane deskew circuitry compensates for lane-to-lane timing skew (e.g., identifying the most latent lane and adding symbol propagation delay within each other lane to match that worst-case latency) and similarly may require symbol buffering. Various other circuit blocks may additionally be disposed within I/O queue 261 (or within content modification queue 277) and serve as possible latency bypass points (e.g., serial-to-parallel conversion circuits, parallel-to-serial conversion circuits, equalization symbol stages, CDR circuitry, etc.). From a switchover timing and block-alignment perspective, any additional bypassed logic blocks (e.g., lane deskew alone or in combination with domain crossing) may be viewed conceptually as subsumed into the content modification queue 271 so that the selected bypass path (e.g., 267, 267, 269) is considered as the input to the content modification queue for purposes of block-alignment delay programming and path-switch timing.

Referring again to FIG. 2, one or more programmed microcontrollers and/or various dedicated hardware circuits (e.g., finite state machines, registered or combinational circuits for identifying EIEOS blocks and/or other types of ordered sets) may be provided to implement all or part of path controller 155. Additionally, the various circuit blocks shown in FIG. 2 and other drawing figures or otherwise discussed herein may be described using computer aided design tools and expressed (or represented), as data and/or instructions embodied in various computer-readable media, in terms of their behavioral, register transfer, logic component, transistor, layout geometries, and/or other characteristics. Formats of files and other objects in which such circuit expressions may be implemented include, but are not limited to, formats supporting behavioral languages such as C, Verilog, and VHDL, formats supporting register level description languages like RTL, and formats supporting geometry description languages such as GDSII, GDSIII, GDSIV, CIF, MEBES and any other suitable formats and languages. Computer-readable media in which such formatted data and/or instructions may be embodied include, but are not limited to, computer storage media in various forms (e.g., optical, magnetic or semiconductor storage media).

When received within a computer system via one or more computer-readable media, such data and/or instruction-based expressions of the above described circuits can be processed by a processing entity (e.g., one or more processors) within the computer system in conjunction with execution of one or more other computer programs including, without limitation, net-list generation programs, place and route programs and the like, to generate a representation or image of a physical manifestation of such circuits. Such representation or image can thereafter be used in device fabrication, for example, by enabling generation of one or more masks that are used to form various components of the circuits in a device fabrication process.

In the foregoing description and in the accompanying drawings, specific terminology and drawing symbols have been set forth to provide a thorough understanding of the disclosed embodiments. In some instances, the terminology and symbols may imply specific details not required to practice those embodiments. For example, the various signaling rates and related frequencies, lane counts, block sizes, encoding/decoding schemes and so forth are provided for purposes of example only—higher/lower/alternative rates, frequencies, lane counts, block sizes, encoding schemes etc. may be implemented in all cases. Similarly, signaling link parameters, protocols, configurations may be implemented in accordance with any practicable open or proprietary standard (PCIe being but one example) and any version of such standard. Links or other interconnection between integrated circuit devices or internal circuit elements or blocks may be shown as buses or as single signal lines. Each of the buses can alternatively be a single signal line (e.g., with digital or analog signals time-multiplexed thereon), and each of the single signal lines can alternatively be a bus. Signals and signaling links, however shown or described, can be single-ended or differential. Logic signals shown as having active-high assertion or "true" states, may have opposite assertion states in alternative implementations. A signal driving circuit is said to "output" a signal to a signal receiving circuit when the signal driving circuit asserts (or de-asserts, if explicitly stated or indicated by context) the signal on a signal line coupled between the signal driving and signal receiving circuits. The term "coupled" is used herein to express a direct connection as well as a connection through one or more intervening circuits or structures. Integrated circuit device or register "programming" can include, for example and without limitation, loading a control value into a register or other storage circuit within the integrated circuit device in response to a host instruction (and thus controlling an operational aspect of the device and/or establishing a device configuration) or through a one-time programming operation (e.g., blowing fuses within a configuration circuit during device production), and/or connecting one or more selected pins or other contact structures of the device to reference voltage lines (also referred to as strapping) to establish a particular device configuration or operational aspect of the device. The terms "exemplary" and "embodiment" are used to express an example, not a preference or requirement. Also, the terms "may" and "can" are used interchangeably to denote optional (permissible) subject matter. The absence of either term should not be construed as meaning that a given feature or technique is required.

Various modifications and changes can be made to the embodiments presented herein without departing from the broader spirit and scope of the disclosure. For example, features or aspects of any of the embodiments can be applied in combination with any other of the embodiments or in place of counterpart features or aspects thereof. Accordingly, the specification and drawings are to be regarded in an illustrative rather than a restrictive sense.

What is claimed is:

1. An integrated circuit component comprising:
   a first symbol propagation path to shift a stream of scrambled symbols to an output of the integrated circuit component for transmission to remote receiver circuitry;
   a second symbol propagation path that enables the first symbol propagation path to be bypassed; and
   path control circuitry to:
      detect, within the stream of scrambled symbols, a first sequence of symbols that will render descrambling circuitry within the remote receiver circuitry to a state independent of symbols that precede the first sequence of symbols within the stream of scrambled symbols; and
      in response to detecting the first sequence of symbols, route the first sequence of symbols to the output of the integrated circuit component via the second symbol propagation path instead of the first symbol propagation path such that the first sequence of symbols is advanced, within the stream of scrambled symbols, ahead a second sequence of symbols that have propagated into the first symbol propagation path;
   wherein end-to-end propagation delay through the second symbol propagation path is lower than end-to-end propagation delay through the first symbol propagation path.

2. The integrated circuit component of claim 1 wherein the path control circuitry is further to route symbols that follow the first sequence of symbols within the stream of scrambled symbols to the output of the integrated circuit component via the second symbol propagation path instead of the first symbol propagation path such that the second sequence of symbols is dropped from the stream of scrambled symbols.

3. The integrated circuit component of claim 2 wherein, due to the lower end-to-end propagation delay of the second symbol propagation path relative to the first symbol propagation path, the symbols that follow the first sequence of symbols propagate from an input of the integrated circuit component to the output of the integrated circuit component in less time than symbols that precede the second sequence of symbols within the stream of scrambled symbols.

4. The integrated circuit component of claim 1 wherein the stream of scrambled symbols is conveyed and bear information in compliance with a Peripheral Component Interconnect Express (PCIe) specification, and wherein the first sequence of symbols constitutes an electrical idle exit ordered-set (EIEOS) as defined by the PCIe specification.

5. An integrated circuit component comprising:
   a first symbol propagation path to shift a stream of scrambled symbols to an output of the integrated circuit component for transmission to remote receiver circuitry;
   a second symbol propagation path that enables the first symbol propagation path to be bypassed; and
   path control circuitry to:
      detect, within the stream of scrambled symbols, a first sequence of symbols that will render descrambling circuitry within the remote receiver circuitry to a state independent of symbols that precede the first sequence of symbols within the stream of scrambled symbols; and
      in response to detecting the first sequence of symbols, route the first sequence of symbols to the output of the integrated circuit component via the second symbol propagation path instead of the first symbol propagation path such that the first sequence of symbols is advanced, within the stream of scrambled symbols, ahead a second sequence of symbols that have propagated into the first symbol propagation path;
   wherein the stream of scrambled symbols is organized in fixed-size logical blocks that are conveyed continuously in respective block transmission intervals, and wherein the first symbol propagation path comprises one or more delay circuits programmably configured to increase end-to-end symbol propagation delay through the first symbol propagation path to an interval that exceeds end-to-end propagation delay through the second symbol propagation path by an integer number of block transmission intervals.

6. The integrated circuit component of claim 5 wherein the fixed-size logical blocks each comprise N bits produced by encoding M bits of information, where N>M.

7. An integrated circuit component comprising:
a first symbol propagation path to shift a stream of scrambled symbols to an output of the integrated circuit component for transmission to remote receiver circuitry;
a second symbol propagation path that enables the first symbol propagation path to be bypassed; and
path control circuitry to:
detect, within the stream of scrambled symbols, a first sequence of symbols that will render descrambling circuitry within the remote receiver circuitry to a state independent of symbols that precede the first sequence of symbols within the stream of scrambled symbols; and
in response to detecting the first sequence of symbols, route the first sequence of symbols to the output of the integrated circuit component via the second symbol propagation path instead of the first symbol propagation path such that the first sequence of symbols is advanced, within the stream of scrambled symbols, ahead a second sequence of symbols that have propagated into the first symbol propagation path;
wherein the path control circuitry comprises circuitry to modify content within a first portion of the stream of scrambled symbols that has propagated into the first symbol propagation path, the first portion preceding the second sequence of symbols within the stream of scrambled symbols.

8. The integrated circuit component of claim 7 wherein the circuitry to modify content within the first portion of the stream comprises circuitry to descramble the first portion of the stream to expose descrambled stream content, modify descrambled stream content to produce modified stream content, and then scramble the modified stream content.

9. The integrated circuit component of claim 8 further comprising an input to receive the stream of scrambled symbols via a signaling link, and wherein the path control circuitry to route the first sequence of symbols to the output of the integrated circuit component via the second symbol propagation path instead of the first symbol propagation path comprises circuitry to route the stream of scrambled symbols through the integrated circuit component via the second symbol propagation path instead of the first symbol propagation path in response to detecting (i) first sequence of symbols and (ii) transition of state information corresponding to the signaling link to a value indicating that modification of content conveyed in the stream of scrambled symbols is unneeded.

10. A method of operation within an integrated circuit component, the method comprising:
shifting a stream of scrambled symbols through a first symbol propagation path to an output of the integrated circuit component for transmission to remote receiver circuitry;
detecting, within the stream of scrambled symbols, a first sequence of symbols that will render descrambling circuitry within the remote receiver circuitry to a state independent of symbols that precede the first sequence of symbols within the stream of scrambled symbols; and
in response to detecting the first sequence of symbols, routing the first sequence of symbols to the output of the integrated circuit component via a second symbol propagation path that bypasses the first symbol propagation path such that the first sequence of symbols is advanced, within the stream of scrambled symbols, ahead a second sequence of symbols that have propagated into the first symbol propagation path;
wherein end-to-end propagation delay through the second symbol propagation path is lower than end-to-end propagation delay through the first symbol propagation path.

11. The method of claim 10 further comprising routing symbols that follow the first sequence of symbols within the stream of scrambled symbols to the output of the integrated circuit component via the second symbol propagation path instead of the first symbol propagation path such that the second sequence of symbols is dropped from the stream of scrambled symbols.

12. The method of claim 11 wherein, due to the lower end-to-end propagation delay of the second symbol propagation path relative to the first symbol propagation path, the symbols that follow the first sequence of symbols propagate from an input of the integrated circuit component to the output of the integrated circuit component in less time than symbols that precede the second sequence of symbols within the stream of scrambled symbols.

13. The method of claim 10 wherein the stream of scrambled symbols is conveyed and bear information in compliance with a Peripheral Component Interconnect Express (PCIe) specification, and wherein the first sequence of symbols constitutes an electrical idle exit ordered-set (EIEOS) as defined by the PCIe specification.

14. A method of operation within an integrated circuit component, the method comprising:
shifting a stream of scrambled symbols through a first symbol propagation path to an output of the integrated circuit component for transmission to remote receiver circuitry;
detecting, within the stream of scrambled symbols, a first sequence of symbols that will render descrambling circuitry within the remote receiver circuitry to a state independent of symbols that precede the first sequence of symbols within the stream of scrambled symbols; and
in response to detecting the first sequence of symbols, routing the first sequence of symbols to the output of the integrated circuit component via a second symbol propagation path that bypasses the first symbol propagation path such that the first sequence of symbols is advanced, within the stream of scrambled symbols, ahead a second sequence of symbols that have propagated into the first symbol propagation path;
wherein the stream of scrambled symbols is organized in fixed-size logical blocks that are conveyed continuously in respective block transmission intervals, the method further comprising programming one or more delay circuits that form part of the first symbol propagation path to increase end-to-end symbol propagation delay through the first symbol propagation path to an interval that exceeds end-to-end propagation delay through the second symbol propagation path by an integer number of block transmission intervals.

15. The method of claim 14 wherein the fixed-size logical blocks each comprise N bits produced by encoding M bits of information, where N>M.

16. A method of operation within an integrated circuit component, the method comprising:
- shifting a stream of scrambled symbols through a first symbol propagation path to an output of the integrated circuit component for transmission to remote receiver circuitry;
- detecting, within the stream of scrambled symbols, a first sequence of symbols that will render descrambling circuitry within the remote receiver circuitry to a state independent of symbols that precede the first sequence of symbols within the stream of scrambled symbols;
- in response to detecting the first sequence of symbols, routing the first sequence of symbols to the output of the integrated circuit component via a second symbol propagation path that bypasses the first symbol propagation path such that the first sequence of symbols is advanced, within the stream of scrambled symbols, ahead a second sequence of symbols that have propagated into the first symbol propagation path; and
- prior to routing the first sequence of symbols to the output of the integrated circuit component via the second symbol propagation path, modifying content within a first portion of the stream of scrambled symbols that has propagated into the first symbol propagation path.

17. The method of claim 16 wherein the stream of scrambled symbols comprises a stream of scrambled and precoded symbols, and wherein modifying content within the first portion of the stream comprises decoding and descrambling the first portion of the stream to expose unencoded and descrambled stream content, modifying the unencoded and descrambled stream content to produce modified stream content and then scrambling and re-precoding the modified stream content.

18. The method of claim 17 further comprising receiving the stream of scrambled symbols via a signaling link, and wherein routing the first sequence of symbols to the output of the integrated circuit component via the second symbol propagation path that bypasses the first symbol propagation path comprises routing the stream of scrambled symbols through the integrated circuit component via the second symbol propagation path instead of the first symbol propagation path in response to detecting first sequence of symbols and in response to detecting transition of state information corresponding to the signaling link to a value indicating that modification of content conveyed in the stream of scrambled symbols is unneeded.

* * * * *

UNITED STATES PATENT AND TRADEMARK OFFICE
CERTIFICATE OF CORRECTION

PATENT NO. : 11,258,696 B1
APPLICATION NO. : 16/893195
DATED : February 22, 2022
INVENTOR(S) : Casey Morrison et al.

It is certified that error appears in the above-identified patent and that said Letters Patent is hereby corrected as shown below:

On the Title Page

At Item (73), at Column 1, Lines 16-17, the Assignee "Asiera Labs, Inc., Santa Clara, CA (US)" should instead read --Astera Labs, Inc., Santa Clara, CA (US)--.

Signed and Sealed this
Seventeenth Day of May, 2022

Katherine Kelly Vidal
*Director of the United States Patent and Trademark Office*